3,403,119
POLYMERIC COATING COMPOSITION CONTAINING A METAL SALT OF AN ORGANIC CARBOXYLIC ACID
Charles I. Sullivan, Melrose, and Francis L. McCarthy, Quincy, Mass., assignors to A. E. Staley Manufacturing Company, Decatur, Ill., a corporation of Delaware
No Drawing. Continuation-in-part of application Ser. No. 404,911, Oct. 19, 1964. This application July 12, 1965, Ser. No. 471,405
18 Claims. (Cl. 260—28.5)

ABSTRACT OF THE DISCLOSURE

A polish composition comprising (1) a water dispersible polyvalent metal salt of an organic carboxylic acid having from 1 to 4 acid groups in a concentration sufficient to impart leveling and selective removability to said polish composition and (2) an aqueous emulsion of a synthetic addition polymer comprising at least one hard monomer selected from the group consisting of monovinyl aromatic compound, alpha, beta-ethylenically unsaturated nitrile and alkyl ester of alpha, beta-ethylenically unsaturated carboxylic acid, said polymer having a Tg of at least 25° C. at an emulsifier content of 5% by weight of the polymeric component.

---

This application is a continuation-in-part of copending application Ser. No. 404,911 filed Oct. 19, 1964.

This invention relates to a new floor polish. More particularly, this invention relates to a new floor polish (either buffable or dry bright), which is neither dulled nor removed by soap (or detergent) and water, but which can be readily removed from the flooring. This invention is also concerned with a method for treating and preserving flooring materials.

The ideal floor polish is a well-balanced composition having the following properties: buffable; spreads easily; levels well; dries rapidly; has high gloss; has good clarity; has little or no tendency to discolor; has resistance to spilled household liquids; has resistance to water spotting; has resistance to scuffing and scratching; has a long life; can be washed with soap (including detergents) and water without being removed or dulled; can be removed easily, when desired, without any deleterious effect on the flooring; and can be recoated with a second layer of polish without removal of the first layer. In recent years, floor polish formulators have turned to floor polishes based on polymers of styrene and/or acrylates in an attempt to find products having a maximum number of these desirable properties. While these floor polishes have met with considerable commercial success, none of them has had all of the above properties. Regardless of what other properties the formulator was willing to sacrifice, it has always been necessary to sacrifice either soap and water resistance or removability. So far as known, until now, commercially available floor polishes, if resistant to dulling and removal by soap and water, either cannot be removed uniformly from the floor or require extensive abrading action that is deleterious to linoleum, asphalt, rubber, vinyl and other tile and other so-called "hard-surface" resilient flooring. For example, hydrocarbon based solvents tend to remove the pigmentation from the surface of the flooring in such a manner that a subsequently applied coat of polish has a dull appearance. On the other hand, strenuous scouring means the abrasion of the flooring.

In addition to the removability problems discussed in the preceding paragraph, it is well-known that synthetic polymers based on styrene and/or acrylates are generally not considered to be suitable for use in buffable floor polishes. In the February 1964 issue of Paint Manufacture, volume 34, No. 2, pages 45–49 and 53, R. Zdanowski of the Rohm & Haas Laboratory points with pride to the fact that a popular commercial buffable polish could have up to 30% of the Fischer-Tropsch polyethylene wax formulation replaced with Rhoplex B–83 polymer emulsion and still retain buffability characteristics of the 100% wax product.

The object of this invention is to provide a floor polish (either buffable or dry bright) that forms a protective coating resistant to washing, and to soap and water, yet is easily, completely and uniformly removable with simple, safe materials that have no deleterious effects on the flooring. A further object of this invention is to provide a buffable floor polish having all of the above-described qualities to a marked degree. Another object is to provide a polymer emulsion composition suitable for a floor polish having the properties already mentioned. Other objects will become apparent from the description below.

The poor detergent-resistance of most floor polishes, it has been found, is due in large part to the presence of alkali-soluble resins and emulsifiers in the floor polish. As pointed out by Zdanowski, alkali-soluble resins can typically comprise as much as 10 to 16.5 percent by weight of the floor polish dry solids. The alkali-soluble resins are necessary to impart to the floor polish the necessary leveling characteristics and glass. Emulsifiers are, of course, necessary in order to produce the synthetic polymers having the proper particle size and in order to impart the necessary coalescing properties and gloss.

Recent attempts to build hydrophobic qualities into floor polishes by using polymers based on aminoalkyl esters of (meth)acrylic acid have met with limited success. Floor polishes based on these polymers, as originally offered to the trade, were supposed to be removable using an acidic stripper. However, many of the acidic strippers had deleterious effects on the flooring and/or were incapable of completely removing applied polishes after they had aged a month or more. Somewhat better removability has been obtained using machine scrubbing with standard tripolyphosphate cleaners.

U.S. Patent 2,754,280 to Brown et al. discloses that nonionic emulsions of copolymers of esters of acrylic acid and/or methacrylic acid and an acid monomer (methacrylic acid, acrylic acid or itaconic acid) and suitable polyvalent metal compounds can be applied as a coating to a surface. The patentees state that the polyvalent metal compounds ionically cross-link free (unesterified) carboxyl groups. The resultant products are stated to be water-insoluble and chemically resistant and to have the properties of the thermosetting resin. No one has suggested using a polymeric system of this type in a floor polish. From the patentees' disclosure, it would appear that it would be impossible to remove the ionically cross-linked polymeric material from the substrate and, accordingly, this type of polymeric system would not appear to be useful in a floor polish composition.

The nonionic emulsion polymer-polyvalent metal compound described in the preceding paragraph would not be considered suitable for use in a floor polish because of the known interaction of polyvalent metal compounds and alkali-soluble resins at the alkaline pH normally required for a floor polish. At an acidic pH the alkali-soluble resin alone (without any polyvalent metal salts) is insoluble and therefore, incapable of performing its functions of dispersing, leveling and coalescing in the floor polish.

U.S. Patent 3,026,281 to Harren et al. discloses that polyvalent metal compounds react with relatively low molecular weight polymeric polyanionic water-soluble materials (i.e. alkali-soluble resins of the type used in floor polish formulations) to form thixotropic thickening agents useful at an alkaline pH. Higher molecular weight polyanionic alkali-soluble materials are said by the patentees to be unsuitable since polyvalent metal compounds precipitate the higher molecular weight materials. Reaction products of alkali-soluble resin and polyvalent metal compounds would be expected to have no use in a typical floor polish.

It has now been found that the objects of this invention can be accomplished by providing an acidic floor polish comprising polyvalent metal salt of an organic acid, which is at least partially soluble in water at an acidic pH, and an aqueous emulsion of addition polymer and emulsifier. So far as is known, the floor polish of this invention is the first acidic floor polish, all others being alkaline. Surprisingly, the acidic floor polish of this invention has no deleterious effects on flooring materials as might have been expected from previous experiences with acidic strippers.

The polyvalent metal salts which are soluble in water at an acid pH seem to serve as leveling agents in the acidic floor polish formulations of this invention and obviate the necessity of using alkali-soluble resins. As pointed out above, conventional alkali-soluble resins are insoluble in aqueous acid. Omission of the alkali-soluble resin eliminates, it is believed, one of the principal sources of detergent sensitivity of the conventional applied floor polishes.

Surprisingly, replacement of alkali-soluble resin with polyvalent metal compound leads to floor polishes, based on synthetic polymers, which are buffable with a much lower concentration of wax than anyone has heretofore believed possible. For example, Zdanowski, supra, indicates that, whereas a 7-to-3 solids ratio of wax to Rhoplex B–83 polymer emulsion yields a buffable floor polish having the same characteristics as an all wax polish, a 1-to-1 ratio yields a floor polish having only fair buffability characteristics. On the other hand, commercially desirable floor polishes having very good buffability characteristics can be prepared using a 3 to 7 ratio of wax to synthetic polymer when the alkali-soluble resin is omitted and, a suitable polyvalent metal salt of an organic acid and the proper polymer emulsion are used at an acid pH, in accordance with this invention.

It is believed that there are a number of factors which contribute to the unique buffability characteristics of the floor polishes of this invention which make it possible to replace more wax with synthetic polymer than previously deemed possible without sacrificing buffability. Omission of alkali-soluble resins, which dry (alone) to form a friable material, seems to convert the floor polish matrix to a structure which is more amenable to flow under pressure. Many of the polyvalent metal salts of organic acids utilizable in this invention apparently form a mobile matrix which permits the applied polish to deform under pressure.

As a general matter, buffability of a wax-containing floor polish may also be attributable to the tendency of the wax to bleed out of the applied polymeric matrix of the polish. Accordingly, organic acid salts of polyvalent metal augment the wax.

Two other important factors that affect buffability, are discussed below. These are the relatively high concentration of surface active agents utilized in the floor polish of this invention and the degree of hardness of the synthetic polymers.

In this invention, the particular polyvalent metal compounds perform at least two other important functions, in addition to leveling and augmenting the action of wax. Some of the polyvalent metal compound apparently reacts with free carboxyl groups of carboxyl-containing floor polishes to render applied floor polishes based on the above described system resistant to conventional detergents. Subsequently, when it is desired to remove the applied floor polish, the polyvalent metal compound aids in the removal of the applied floor polish with a suitable alkaline stripper such as a mixture of detergent and water-miscible organic solvent. Superficially, these last two functions appear inconsistent. However, this illustrates the selectivity of operation of the polyvalent metal salts in this invention. For example, two acidic floor polishes, which were essentially the same except that one contained polyvalent metal salt of an organic acid and one did not contain this component, were applied to a suitable substrate. In each case, the synthetic polymer employed contained approximately 3% by weight acid monomer units. The applied floor polish containing no polyvalent metal salt was removable using two of five commercially sold floor polish strippers in the recommended manner; the other three strippers had no effect. However, even at twice the recommended concentration, none of the five strippers had an effect on the applied polish containing polyvalent metal salt. On the other hand, a new stripper, of the type described below, readily removed the polish containing the polyvalent metal salt, but only partly removed the polish having no polyvalent metal salt.

The removability imparted by polyvalent metal compounds is illustrated further by floor polishes of this invention which contain a low concentration of acid monomer in the synthetic polymer. Two floor polishes of the type described in the preceding paragraph (one containing polyvalent metal salt of an organic acid and one without) were prepared from a synthetic polymer of the type employed in the preceding paragraph but with no free carboxyl groups. The applied polish containing no polyvalent metal compound was not removable with any detergent or strippper tried (including the strippers normally utilizable in this invention) while the applied polish containing polyvalent metal compound was removable with the strippers normally utilizable in this invention.

The detergent resistance imparted by polyvalent metal compounds is illustrated further by floor polishes of this invention which contain a high concentration of acid monomer in the synthetic polymer (normally very sensitive to water). Two floor polishes of the type described in the preceding two paragraphs were prepared from a synthetic polymer which contained about fifteen percent by weight acid monomer units. After aging one week, the applied floor polish containing no polyvalent metal compounds was removable with detergents (exhibiting the expected water sensitivity) while the applied polish containing polyvalent metal compound was substantially unaffected.

Acordingly, it can be seen that, in the floor polishes of this invention, the polyvalent metal compound imparts (1) resistance to conventional detergents and (2) removability with certain classes of floor-polish strippers. The exact mechanism through which the polyvalent metal compound performs these functions is not clear. However, it is believed that the detergent resistance of floor polishes, which contain synthetic polymers having free carboxyl groups and are normally detergent sensitive, is due in part to ionic cross-linking of the free carboxyl groups through the polyvalent metal. However, the removability of applied floor polishes of this invention does not seem to be dependent on the destruction of ionic cross-links. As pointed out above, the polyvalent metal compound imparts removability even to acidic floor polishes having no free carboxyl groups and insensitive to strippers and to detergent. The new polish-strippers of this invention apparently swell the polyvalent metal compound. As the polyvalent metal compound swells, the bond between polymer particles and between the polish layer and substrate are loosened, thereby enabling complete removal.

Polyvalent metal salts of organic acids useful in this invention which are at least partially soluble in water at an acidic pH (i.e., dispersible in water) include zinc acetate, zinc caprylate, zinc citrate, zinc formate, zinc isovalerate, zinc lactate, zinc malate, zinc oxalate, zinc propionate, zinc salicylate, basic aluminum acetate, aluminum citrate, aluminum diformate, aluminum formacetate, aluminum triformate, titanium oxalate, zirconium acetate, zirconium lactate, barium acetate, calcium acetate, calcium benzoate, calcium gluconate, calcium lactate, calcium mandelate, calcium propionate, calcium salicylate, calcium succinate, calcium tartrate, magnesium acetate, magnesium acetyl salicylate, magnesium benzoate, dibasic magnesium citrate, magnesium formate, magnesium gluconate, magnesium lactate, magnesium salicylate, strontium acetate, strontium salicylate, lead acetate, lead formate, lead salicylate, cobaltous acetate, cobaltous citrate, cobaltous formate, cobaltous succinate, chromic acetate, chromous oxalate, cupric acetate, cupric gluconate, cupric lactate, etc. In general, the colorless salts are preferred. Best results have been attained using salts of zinc, cadmium and aluminum, preferably the acetates. Zinc acetate is particularly preferred. If desired, the salt may be formed in situ, e.g., adding acetic anhydride or acid to a polymer emulsion containing zinc oxide.

These compounds can comprise from about 5 to 100 parts by weight of metal salt per 100 parts by weight of emulsion polymer solids. As the concentration of polyvalent metal salt of an organic acid increases up to a point, the detergent resistance of the applied polish increases. However, at the same time the tendency of the applied polish to lose its gloss and become hazy, also increases. Any loss in gloss can, in turn, be overcome by increasing the nonionic emulsifier content of the polish. However, as the emulsifier content increases, the applied polish becomes progressively softer, with attendant disadvantages. For these reasons, the optimum concentration of polyvalent metal compound is considered to be about 10 to 25 parts by weight per 100 parts by weight of emulsion polymer solids. At these concentrations of polyvalent metal-organic acid salt, nonionic emulsifier concentration is preferably kept in the range of about 0.5 to 2.0 parts by weight per part by weight of polyvalent metal compound.

As indicated above, the products of this invention comprise two essential components which are (1) polyvalent metal salt of an organic acid and (2) an aqueous emulsion of polymer and emulsifier. For formulation of a floor polish having optimum detergent resistance and removability, the aqueous emulsion of polymer and emulsifier is further characterized in that the polymer has a glass transition temperature (Tg) of at least 25° C. at an emulsifier content of 5% by weight of the polymeric component. The products are further characterized in that the polish composition is not film-forming at room temperature in the absence of polish coalescing agents and polish plasticizers.

The glass transition temperature (Tg) of a polymer emulsion may be measured, as described by Cahill and McCarthy in Soap and Chemical Specialties 30, No. 4, 88 ff. (April 1964). At this temperature, a high molecular weight thermoplastic polymer changes from a hard, somewhat brittle form to a rather soft, rubbery form. A number of properties undergo a large change within a narrow temperature range, among them torsional stiffness. Measurements of torsional stiffness are made in accordance with ASTM Test Method D 1043–51 at a series of temperatures bridging the transition temperature. These values are plotted and the linear portions of the curve are extrapolated to an intersection which is the glass transition temperature Tg.

The Tg of a polymer emulsion is dependent on the concentration of emulsifier or emulsifiers (weight ratio of emulsifier to polymer) and the monomer or monomers making up the polymer. Generally, the Tg of a polymer emulsion decreases as the weight ratio of emulsifier to polymer increases. Since the water sensitivity of a coating deposited from a polymer emulsion increases as the weight ratio of emulsifier to polymer increases above a certain optimum, polymer emulsions are normally prepared (emulsion polymerization or emulsification of preformed polymers) with the smallest concentration of emulsifier that will provide desired properties (e.g. polymer particle size and polymer emulsion stability). With the emulsifier proportion fixed, the Tg of the polymer emulsion can then be adjusted by means of the proportions and distribution of hard monomer and soft monomer in order to form a polymer which is film-forming at the desired application temperature, usually room temperature. The Tg of a polymer emulsion increases as the concentration of hard monomer in the polymer increases and, conversely, decreases as the concentration of soft monomer increases. (The terms "hard" and "soft" are used herein in reference to polymers formed from the monomers alone, in the way that is common in this technology. See Riddle, Acrylic Esters, Reinhold Publishing 1954, page 58 et seq.; also U.S. Patent No. 2,795,564. Generally, this refers to the "brittle-point" of the polymer, i.e. the temperature at which the polymer breaks on flexing. The hard monomers useful in this invention have brittle points in excess of 20° C.)

The concentration of emulsifier in the aqueous polymeric emulsion, the ratio of hard monomer to soft monomer, and the specific monomers employed also have a decided effect on the physical properties of applied floor polishes. As pointed out above, normally the higher the concentration of emulsifier, the more water-sensitive is the applied coating. Contrary to this general rule, the emulsifier level has virtually no effect on the water-sensitivity of the floor polishes of this invention. It was found, however, that as the concentration of emulsifier was increased, the hardness of the applied coating decreased. If carried too far, the applied polish is too soft, and dirt becomes embedded easily in the polish, thereby shortening the life of the polish.

The polymeric compositions of this invention have an unusually high concentration of emulsifier to assure clarity and freedom from haze in the presence of the polyvalent metal salt. If the concentration of emulsifier is too low, the preferred polymers of this invention tend to dry with somewhat more haze than is desirable in a floor polish. To avoid any softening effect of emulsifier added to maintain the desired clarity and, yet to impart the necessary abrasion-resistance to the applied floor polish, the polymers used in this invention contain a relatively high concentration of hard monomer. Stated differently, the polymeric component of the invention, is such that it has glass transition temperature (Tg) of at least 25° C. when compounded with 5% by weight of an emulsifier. Polymers having a Tg below 40° C. impart to the final floor polish a tendency to pick up dirt at a faster rate than desirable thereby decreasing the life of the final polish. The addition of extremely hard waxes, acid soluble resins or additional polyvalent metal compound to the floor polish can counteract this undesirable property. Desirably, the Tg of the polymer at this emulsifier level is at least 40° C. and preferably at least 65° C.

As indicated above, the polymers useful in this invention for the preparation of a removable, detergent-resistant floor polish must have a Tg of at least 25° C. (preferably at least 65° C.) at an emulsifier concentration of 5% by weight of the polymeric component. For the most part these polymers are composed of three different monomer types, i.e. "hard" monomer, "soft" monomer and free-carboxyl-containing monomer. "Hard" monomer is, of course, essential for preparation of a polymeric emulsion having a Tg of at least 40° C. "Soft" monomer can be omitted, but only at the expense of using an undesirably high concentration of emulsifier. However, it is far better to use "soft" monomer since it serves to impart the proper-film-forming characteristics, i.e. it aids in forming a continuous, clear, craze-free layer which withstands normal wear, impact and flexure without cracking.

The function of the free-carboxyl-containing monomer and the effect of its omission is explained above.

The hard monomer imparts to the polymer and floor polish prepared therefrom the abrasion-resistance normally expected of the floor polish. The concentration of hard monomer necessary to impart the desired properties to the polymer emulsion, can range from 50 to 100% by weight of the polymer. Best results have been obtained using from 60 to 85% by weight hard monomer.

Suitable hard monomers include monovinyl aromatics such as styrene and ring-substituted styrene (vinyl toluene, 2,5-dichlorostyrene); alpha, beta-ethylenically unsaturated nitriles such as acrylonitrile and methacrylonitrile; hard esters of alpha, beta-ethylenically unsaturated carboxylic acid esters such as methyl methacrylate, tert-butyl methacrylate, cyclohexyl acrylate and dimethyl itaconate, dimethyl maleate, etc. Of these the monovinyl aromatics and alpha, beta-ethylenically unsaturated nitriles are preferred. Floor polishes comprised of polymer having a high concentration of monomers of these two classes, particularly mixtures of styrene and acrylonitrile, have exceptional detergent-resistance and other properties desired in a good floor polish. The monovinyl aromatics having no saponifiable groups are particularly useful in imparting detergent-resistance to the floor polish. The polar nature of the nitrile group enhances the leveling properties of the final polish and the adhesion to new tile which can sometimes be a problem. Acrylonitrile is particularly useful because of the toughness that it imparts to the final polish. Further, acrylonitrile and styrene are both quite inexpensive. For best results, the polymer should contain at least 50% by weight monovinyl aromatic monomer and/or nitrile monomer.

On the other hand, as the concentration of hard ester of alpha, beta-ethylenically unsaturated caboxylic acid in the polymer increases, the floor polish becomes less detergent-resistant, is more susceptible to water spotting and consequently must be removed or recoated sooner. For example, when methyl methacrylate, the least expensive (although about twice the price of acrylonitrile and three times the price of styrene) and most commonly used hard ester monomer, comprises 50% by weight of the hard monomers in the polymer, the resultant polish is somewhat deficient in detergent-resistance. If methyl methacrylate is the only hard monomer, the floor polish is relatively prone to water spotting. This is to say that in comparison with polish based on polymers having over 50% monovinyl aromatic and/or nitrile, the detergent resistance and "floor-life expectancy" of floor polishes based on polymer having a high concentration of hard ester monomer are relatively poor. Yet, even these latter polishes have high detergent resistance and removability characteristics of a relatively high order when compared with commercially available products. However, the increased cost and poorer properties will not normally justify the use of the ester monomers in high concentration, i.e., over 50% by weight of the hard monomer.

While the soft monomer can comprise up to about 45% by weight of the polymer, best results have been obtained using from about 10 to 35% by weight. Suitable soft monomers include primary or secondary alkyl esters of acrylic acid containing up to 8 carbon atoms in the alkyl group and primary or secondary alkyl esters of methacrylic acid containing from 4 to 12 carbon atoms in the alkyl group. Representative soft monomers are methyl acrylate, ethyl acrylate, isopropyl acrylate, butyl acrylate, amyl acrylate, hexyl acrylate, heptyl acrylate, 2-ethylhexyl acrylate, butyl methacrylate, amyl methacrylate, dodecyl methacrylate, etc.

The free carboxyl-containing monomer can comprise up to 25% by weight of the polymer. Generally, it is advisable to employ 0.5% to 15% by weight free carboxyl containing monomer. Best results have been obtained with 1 to 5% by weight free carboxyl monomer. Suitable carboxyl containing monomers include acrylic acid, methacrylic acid, ethacrylic acid, itaconic acid, monobutyl itaconate, etc.

Briefly the aqueous copolymers of this invention can be prepared by either forming an aqueous emulsion premix, adding the monomers to be polymerized and catalysts to the emulsion premix and polymerizing said monomers or, alternatively, by emulsifying a prepared polymer. The former method is preferred since it is more convenient, yields products having more uniform properties and is susceptible of more precise control. It is particularly difficult to prepare polymers having the necessary particle size by emulsification of prepared polymer. If the average particle size of the polymer particle is more than 2 microns, the final polish lacks the gloss required of a good floor polish.

The emulsifiers useful for dispersal or emulsification of monomer or polymer may be chosen from a wide variety of nonionic surface active agents and anionic surface active agents particularly anionic surface active agents having a polyoxyethylene chain of at least 5 oxyethylene units. Two or more surface active agents are frequently used, of one or both types, and it is preferred to use both an anionic and nonionic in combination. The preferred nonionic surface active agents alkyl or (alkyl phenoxy polyoxyethylene ethanol) are composed of a hydrophobic hydrocarbon portion and a hydrophilic portion. The latter is a chain of 5 to 120 oxyethylene units while the former has an alkyl group of 4 to 18 carbon atoms which may be linked to the oxyethylene chain through the phenoxy group. Generally speaking, as the average length of the hydrocarbon chain in a monomer mixture increases, nonionic surface active agents having a smaller number of oxyethylene groups should be used, i.e., those of greater oil solubility.

The compatibility of many such nonionic surface active agents with the polyvalent metal salts of this invention is not destroyed by the presence of an anionic group. Such surface active agents, referred to as anionic-nonionic, normally have a hydrophilic anion, hydrophobic cation and a long-chain polyoxyethylene chain of 5 to 120 oxyethylene units. Typical useful surface active agents of this type are alkali metal salts of alkyl phenoxy polyoxyethylene ethanol sulfate esters having 5 to 120 oxyethylene units and the corresponding alkyl oxyethylene ethanol sulfate esters. For the purpose of this invention these anionic-nonionic surface active agents can be considered to be nonionic surface active agents and can be used interchangeably. In large measure, the selection of surface active agent (or agents) for the present polymer is the same as for many prior art emulsion polymerization systems.

In emulsion polymerization, the amount of surface active agent or agents required, varies primarily with the concentration of monomers to be handled and to a minor extent with the choice of emulsifier, monomers, portion of monomers and catalysts. Generally, the amount of surface active agent used in the polymerization mixtures will range from about 4 to 25% of the total monomer weight. Lower concentrations in the range of about 1 to 4% by weight can be used. However, the emulsion must then be post stabilized with sufficient surface active agent to prevent coagulation of the polymer upon addition of the polyvalent metal compound or to prevent development of haze in the applied polish coating. Somewhat the same principles apply in the selection of the amount of surface active agent as in the selection of the surface active agent itself. The proportion must be sufficient to impart the necessary stability, desired rate of polymerization, and particle size.

As polymerization catalysts, there may be used one or more of the peroxidic compounds better known to act as free-radical catalysts which have at least some solubility in aqueous solution of the emulsifier or which are soluble only in the monomer phase. Among the useful catalyts for the present type of copolymerization are the persulfates, ammonium, sodium and potassium salts, hydrogen peroxide and the perborates. Also useful, are the organic peroxides and hydroperoxides. These include benzoyl peroxide, tertiary butyl hydroperoxide, di-isopropyl benzene hydroperoxide, cumene hydroperoxide, caproyl peroxide, methyl ethyl ketone peroxide, etc. Other free-radical catalysts are also useful, such as azodiisobutyronitrile and other aliphatic azo compounds of the type having an acyclic azo group and an aliphatic carbon atom on each nitrogen, at least one of which is tertiary. In part, the particular combination of monomers governs the selection of the inorganic or organic peroxidic catalysts since some monomers respond better to one variety than they do to another.

The amount of peroxidic catalysts required is about proportional to the concentration of monomers used. The usual range is 0.01% to 3% of catalyst with reference to the weight of the monomer mixture. The optimum amount of catalyst is determined in large part by the nature of the partcular monomer selected, including impurities (including polymerization inhibitors) which accompany particular monomers.

Frequently a promoter for the catalyst (sometimes called an "accelerator" or "adjuvant") is used to hasten the reaction at a sufficiently low temperature to avoid coagulation. The promoter may be a reducing agent and together with the peroxidic catalyst is frequently referred to as a "redox system." Many examples of such systems are known and the promoters include ascorbic acid, and soluble sulfites, hydrosulfites, sulfoxylates, thiosulfates, and bisulfites. Examples of particular promoters are sodium hydrosulfite, sodium metabisulfite, zinc or sodium formaldehyde sulfoxylate, and calcium bisulfite. Polyvalent metal ions are also used in small concentration, particularly ferrous iron in the form of ferrous ammonium sulfate at concentrations of a few parts of ferrous ion per million.

The amount of promoter required varies, as is known, with the free-radical initiator chosen and with the particular promoter. The emulsifying agent also affects somewhat the amount used as do the particular monomers. At the outside, not more than 3% or less than 0.01% is used in these situations. The preferred range of ascorbic acid is at the low end of this range up to about 0.5% while sulfites are used preferably in an amount of 0.2% to 1%.

Copolymerization is best effected below about 95° C. The preferred range is 30 to 70° C., although slightly lower (0° C.) temperatures are permissible. After most of the monomers have been converted to copolymer, temperatures even higher than 95° C. may then be applied. In fact, after most of the monomers have been copolymerized, the resulting emulsion copolymer system can be heated to boiling without breaking the emulsion. During copolymerization the temperature can be controlled in part by the rate at which monomers are supplied and polymerized and/or by applied cooling.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomer as polymerization proceeds. An advantage of gradual or stepwise addition of monomers lies in reaching a high solids content with optimum control and maximum uniformity of product. Additional catalysts or additional components of the redox system may be added as polymerization proceeds, and these can be used to control the speed of reaction to avoid overheating.

A convenient method of carrying out the polymerization utilizing the preceding principles comprises preparing separate pre-mixtures as follows: (1) a catalyst-emulsifier pre-mixture; (2) a first monomer pre-mixture; and (3) a second monomer pre-mixture which contains the balance of the monomers to be polymerized. If desired, third and fourth monomer pre-mixtures may also be employed. In this method of performing the reaction, the catalyst-emulsifier pre-mixture is preferably prepared in warm water (30 to 50° C.). To this, the first monomer pre-mixture is added and the polymerization is initiated. After the reaction becomes exothermic, the second monomer pre-mixture is added over a time sufficient to permit the temperature to be controlled throughout the reaction. The same care is taken with any other monomer pre-mixtures. Additional catalysts and/or promoter is added when necessary to maintain the reaction. Finally, the reaction is permitted or forced to go to completion, which is insured (1) by raising the temperature to about 85° C., and/or (2) by the addition of additional catalysts and/or promoter.

In general, the preferred polymer emulsions resulting from the emulsion polymerization of three monomer types are acidic because of the proportion of acid comonomer. These polymer emulsions can, if necessary, be adjusted to a pH of 3.5 to 7 with volatile alkali, such as morpholine or ammonia and/or a non-volatile polyvalent metal salt of an organic acid. Many of the polyvalent metal salts, organic acid, in accordance with this invention, serve well to buffer the emulsion in the pH range stated. For example, zinc acetate solutions in water have a pH of 6.2 to 6.7 depending on concentration. If the polymer emulsion has a pH more than 7.0, it may be adjusted to a value below 7 with a suitable acid (e.g. hydrochloric acid, acetic acid, sulfuric acid) or with an acid metal salt (e.g. zinc chloride or ammonium chloride).

The polymer emulsion can be shipped in either form, partially neutralized or not, to a floor polish formulator, or it can be formulated with the other ingredients of the floor polish immediately after the formation of the polymer emulsion. Generally, the polymer emulsion is shipped after the addition of the previously described polyvalent metal salt of organic acid. If desired, emulsion polymerization can be carried out in the presence of the polyvalent metal salt. However, particle size control is somewhat difficult.

Generally, the polyvalent metal salts are dispersed or dissolved in water prior to their addition to the polymer emulsion. The solution or dispersion can then be added hot or cold. There is rarely a need to adjust the pH of the polyvalent metal dispersion because their aqueous solutions act as a buffer in the desired pH range. The addition of the polyvalent-metal, organic-acid salt to the polymer emulsion seems to affect the emulsion as if the particle size of the polymer had increased. The final product may be filtered to remove coagulated polymer if desired.

The characteristics of a dried film of floor polish are improved by the addition of various additives to the acidic polymer emulsion which contain polyvalent metal salt of an organic acid. One may add, for example, a wax such as carnauba wax, candelilla wax, Fischer-Tropsch wax, oxidized polyethylene wax, polyethylene emulsion, modified Montan wax or ester wax, mixtures of rosin amine in polyethylene emulsion, copolymers of ethylene and acrylate esters, etc. The primary function of wax in a floor polish is to impart certain desirable film characteristics, such as mar resistance, buffability, flexibility, etc. Further, wax may also contribute to the soap-and-water and alkali resistance of the applied polish.

However, unlike commercially available floor polishes, wax is not essential for the preparation of a suitable floor polish from the polymer emulsions of this invention. Acceptable floor polishes have been formulated without using any wax. Apparently, the combination of nonionic surface active agents and polyvalent metal salt of organic acid is able to take the place of the wax. For a completely buffable floor polish, wax is essential.

Other additives, as are common in floor polishes, include methyl Carbitol and/or tributoxyethyl phosphate which act as leveling agents, softeners (plasticizers) and coalescing agents, fluorinated compounds of U.S. Patent No. 2,937,098, such as FC–134 sold by Minnesota Mining and Manufacturing Company, which serve as leveling aids, etc. These leveling aids and softeners are particularly important in this invention since the polymer emulsion is not film-forming at room temperature. Additives must be employed in order to give the floor polish the necessary coalescing properties. Methyl Carbitol is particularly useful in this invention as a coalescing agent. Fugitive coalescing agents of this type (methyl Carbitol, ethyl Carbitol, butyl Carbitol) advantageously comprise from about 10 to 60 parts by weight per 100 parts by weight of polymer solids in the floor polish. Surprisingly, relatively high concentrations of coalescing agents of this type of softener and of leveling agents have virtually no effect on the water resistance or detergent resistance of the floor polishes of this invention.

The various ingredients of a floor polish of this invention are formulated in water at about 8 to 20% by weight of total solids concentration with the aid of a nonionic surface active agent, such as one of the type described above which is suitable for preparing the polymer emulsion. Then one or more leveling agents, coalescing agents and/or plasticizers are added to the floor polish, such as methyl Carbitol, tributoxyethyl phosphate or fluorocarbon surface active agent. The floor polish is then adjusted, if necessary, to a pH of about 5 to 6.8, preferably 6.0±0.3. This pH range has been found to result in floor polishes having optimum properties.

The floor polishes of this invention can be removed from resilient flooring easily and without any deleterious effect on the substrate. A wide variety of removers are feasible. In general, the removers comprise water, alkali and one or more water-miscible organic solvents. Best results have been obtained using a system having a pH of about 10 to 12 with the alkalinity being provided by a detergent, preferably containing trisodium phosphate, and a water-miscible organic solvent comprising one or more water-soluble alcohols such as ethylene glycol, propylene glycol, butoxyethoxy propanol, butoxyethanol, etc. In the absence of water-miscible organic solvent, the detergent cleans the floor polish surface and does not remove the applied polish. Other types of removers are feasible such as those based on chelating agents or complexing agents. However, this invention is not to be considered limited in any manner by the class of remover employed.

The following examples are merely illustrations and should not be construed as limiting the scope of this invention. In the example, the word "parts" refers to parts by weight.

Example I

The following premixtures were prepared to be used in the preparation of a preferred floor polish polymer of this invention.

Catalyst-emulsifier premixture: Parts dry weight
  Sodium salt of lauryl polyethoxysulfate,
    $C_{12}H_{25}$—$(OCH_2$—$CH_2)_{50}$—$OSO_3Na$ ____ 6.52
  Nonylphenyl ether of polyoxyethylene (10.5)
    glycol (Tergitol NPX) _____ 2.0
  Tertiary butyl hydroperoxide _____ .25
  Water _____ 130.5
First monomer premixture:
  Styrene _____ 27
  Ethyl acrylate _____ 14
  Methacrylic acid _____ 3
Second monomer premixture:
  Styrene _____ 25.25
  Ethyl acrylate _____ 10.0
  Acrylonitrile _____ 11.95
Third Monomer Premixture: Styrene _____ 5.75
Promoter:
  Ascorbic acid _____ .10
  Water _____ 40.0
Additional catalyst:
  Tertiary butyl hydroperoxide _____ .25
  Water _____ 10.0

The emulsifier-catalyst premixture was prepared in hot water in a suitable glass-lined reactor fitted with a stirrer and jacket. After the reactor was cooled to 35° C., 15% of the first monomer premixture and 40% of the promoter premixture were added to the reactor over a 1 hour period while maintaining the exothermic reaction at 55–60° C. Half of the additional catalyst premixture was added half way through the addition of the first monomer premixture. The second monomer premixture and 20% of the promoter premixture were slowly added to the reactor while maintaining the reaction at 55–60° C. Thirty percent of the additional catalyst premixture was added after the addition of second monomer premixture was completed. The third monomer premixture was next added and this was followed by the addition of the remaining additional catalyst premixture. Then the polymerization reaction was forced to completion by adding the remainder of the promoter premixture over a thirty minute period and increasing the reaction temperature to between 75 and 80° C. The resulting 36% total solids polymer emulsion had less than 0.05% coagulum and a Tg of 71.5° C.

The polymer emulsion was diluted with water to 30% by weight total solids and compounded with additional surface active agent, fugitive coalescing agent and polyvalent metal salt of an organic acid in the following proportions:

POLYMER BLEND

|  | Active Weight in Parts | Wet Weight in Parts |
|---|---|---|
| Emulsion Polymer (30% solids) | 22.5 | 75 |
| Nonyl phenyl ether of polyethylene glycol (30% active) | 2.1 | 7 |
| Diethylene glycol monomethyl ether (methyl Carbitol) (100% active) | 4.0 | 4 |
| Zinc acetate (20% active) | 3.0 | 15 |

The resulting composition was completely stable. For use in the examples following, the resulting polymer blend was diluted with water to 14% active ingredients. The composition had a Tg of 45° C.

Example II

This example illustrates the preparation of dry-bright floor polish from the polymer blend of Example I. A nonionic-anionic wax emulsion was prepared by melting 47.1 parts by weight polyethylene and 52.9 parts by weight Hoechst KSL ester wax together at 220° F. Eight and four-tenths parts by weight of polyoxyethylated fatty alcohol (Emulphor ON-870) (or Hoechst emulsifier 2106), 9.4 parts by weight (Igepal CO-630) nonylphenoxypolyoxyethylene (9.5) alcohol, 3.7 parts by weight sorbitan trioleate and 3.3 parts by weight aqueous KOH (0.66 part dry solids) were blended into the melt with agitation. The resulting melt was slowly stirred into 748.1 parts by weight water at 205–210° F. using good agitation and then cooled rapidly to form a 14% by weight wax emulsion.

The dry-bright floor polish was prepared by adding, in order, 7.5 parts by weight of the described wax emulsion (14% by weight solids), 0.9 part by weight tributoxyethyl phosphate, 2.0 parts diethylene glycol monomethyl ether and 0.5 part by weight cationic surface active agent having a long fluorocarbon group and a solubilizing organic group (FC-134) (1% by weight solids) with good agitation to 92.5 parts by weight of the polymer blend of Example I (14% by weight active ingredients).

Example III

An excellent buffable floor polish was prepared in the manner described in Example II except that the concentration of wax emulsion (14% by weight solids) was increased to 30 parts by weight and the polymer blend concentration (14% by weight solids) was decreased to 70 parts by weight.

Example IV

This example illustrates that the floor polishes of this invention, when compared to typical acrylic polishes, as well as to both household and industrial acid-sensitive (polishes based on aminoalkyl acrylates) types were equal to or superior in performance. Table I summarizes the results of conventional bench tests.

hours showed complete removal of all commercial products evaluated and only slight discoloration of the prod-

TABLE I

| Property Tested | Dry-Bright Polish of Example II | Buffable Polish of Example III | Household Dry-Bright Acrylic | Household Dry-Bright Acid-Sensitive | Industrial Buffable, Acid-Sensitive |
|---|---|---|---|---|---|
| Gloss | Excellent | Excellent | Excellent | Very good | Excellent. |
| Leveling | Very good | Very good | do | do | Very good. |
| Haze | None | None | None | None | None. |
| Craze | do | do | do | do | Do. |
| Waterspotting (1 hr.): | | | | | |
|   Initial | Excellent | Excellent | Very good | Very good | Excellent. |
|   Final | do | do | Excellent | Excellent | Do. |
| Recoatability (½ hr.): | | | | | |
|   Initial Gloss | Excellent | do | Very good | Very good | Do. |
|   Final Gloss | Increased | Increased | Same | Increased | Increased. |
| Wet Abrasion Resistance | Excellent | Excellent | Excellent | Excellent | Excellent. |

Example V

This example illustrates the remarkable detergent-resistance of floor polishes of this invention. Special bench tests to determine detergent-resistance were run in the following manner: Vinyl, rubber, vinyl asbestos and asphalt tile panels were coated with test polish using a gauze applicator and allowed to dry. Detergent resistance was checked by applying 1 ml. of detergent, allowing it to remain for 3 minutes, rinsing the panel under running water and then wiping it dry with a soft towel. The residual effect of the detergent on the polish film was then recorded, at 1, 3, 7 and 14 days.

The special bench tests showed that the conventional commercial acrylic polishes had no resistance to detergents. The commercial acid sensitive polishes (based on aminoalkyl acrylates) particularly the industrial type, had some but not complete resistance after a two week test period, while the polishes of this invention attained complete resistance to most detergents after 24 hours of drying time. Table II compares the effect of various detergents on the applied floor polishes. Tests at 2, 4, and 8 hours showed complete removal of all commercial products evaluated and only slight discoloration of the products of this invention. To simplify the following table, those early results are not shown.

TABLE II.—TIME (IN DAYS) REQUIRED TO ACHIEVE COMPLETE DETERGENT RESISTANCE

| Polish | Substrate | Solid Detergent V (pH 10) | Solid Detergent V (pH 12) | Liquid Household Detergent W (pH 9.5) | Liquid Detergent X (pH 9.4) | Liquid Detergent Y (pH 9.5) | Liquid Detergent Z (pH 9.6) |
|---|---|---|---|---|---|---|---|
| Buffable polish of Example III | Vinyl | 1 | 1 | 1 | 1 | 1 | 1 |
|  | Rubber | 1 | 1 | 1 | 1 | 1 | 1 |
|  | Vinyl asbestos | 1 | 1 | 1 | 1 | 1 | 1 |
|  | Asphalt | 1 | 1 | 1 | 1 | 1 | 1 |
| Dry-Bright Polish of Example II | Vinyl | 1 | 1 | 1 | 1 | 7 | 1 |
|  | Rubber | 1 | 1 | 1 | 1 | 3 | 1 |
|  | Vinyl asbestos | 1 | 1 | 1 | 1 | 3 | 1 |
|  | Asphalt | 1 | 1 | 1 | 1 | 1 | 1 |
| Commercial Industrial Acid-Sensitive Buffable Polish | Vinyl asbestos | (¹) | (¹) | 7 | (¹) | (¹) | 14 |
|  | Vinyl | (¹) | (¹) | (¹) | (¹) | (¹) | (¹) |
|  | Rubber | (¹) | (¹) | (¹) | (¹) | (¹) | (¹) |
|  | Asphalt | (¹) | (¹) | 14 | 14 | 7 | (¹) |
| Commercial Household Acid-Sensitive Dry-Bright Polish | Vinyl asbestos | (¹) | (¹) | 14 | (¹) | (¹) | 14 |
|  | Vinyl | (¹) | (¹) | (¹) | (¹) | (¹) | 14 |
|  | Rubber | (¹) | (¹) | (¹) | (¹) | (¹) | (¹) |
|  | Asphalt | (¹) | (¹) | 7 | 14 | (¹) | (¹) |

¹ Indicates that the polish film was still affected by the detergent, even after two weeks. The above data clearly show the superior detergent resistance of the floor polishes of this invention.

EXAMPLE VI

This example illustrates that the floor polishes of this invention can be easily removed from flooring materials using a suitable remover. For this evaluation, three household polish removers and three heavy-duty industrial strippers were chosen. A special remover having a pH of 11.0 was also formulated by adding 6.0 parts by weight trisodium phosphate, 10.0 parts by weight ethylene glycol, 3.0 parts by weight butoxyethoxy propanol to 81 parts by weight water. The coated tiles were aged for two weeks and then tested by applying 1 ml. of remover, allowing it to remain for 3 minutes, rinsing with running water and wiping dry with a soft towel. The residual effect of the remover on the film was observed and recorded in Table III below.

TABLE III.—FLOOR POLISH REMOVER TEST RESULTS

| Polish | Substrate | Liquid Floor Polish Remover | | | | | | Remover of this Example |
|---|---|---|---|---|---|---|---|---|
|  |  | Household | | | Industrial | | |  |
|  |  | 1 | 2 | 3 | 1 | 2 | 3 |  |
| Buffable Polish of Example III | Vinyl | D | U | P | D | P | U | R |
|  | Rubber | D | U | D | D | P | U | R |
|  | Vinyl asbestos | P | U | D | U | D | U | R |
|  | Asphalt | U | U | U | U | U | U | R |
| Dry-Bright Polish of Example II | Vinyl | D | U | P | D | D | U | R |
|  | Rubber | D | U | U | U | D | U | R |
|  | Vinyl asbestos | D | U | U | U | D | U | R |
|  | Asphalt | D | U | U | U | U | U | R |

Key.—R=Removed; P=Partially removed; D=Discolored; U=Unaffected.

The above data illustrates that the polishes of this invention can be removed with a suitable stripper. The data also indicate to some extent the resistance of the floor polishes of this invention to removal with commercial strippers. However, while bench tests on individual tiles are used to compare the capabilities of a remover, most industrial removers are used on the floor with an industrial buffing machine and nylon stripping pad. There are many special industrial polish removers available and it is quite possible that one or more of them will be effective in removing the polishes of this invention.

Example VII

The buffable polish of Example III and a standard commercial buffable floor polish noted for its high performance were applied in several diverse locations by an established Industrial Maintenance Service. Test areas included a local department store, a new apartment building and an industrial office building. In all locations, the buffable polish of this invention exhibited superior initial gloss without buffing. The standard buffable polish exhibited the same level of gloss only after buffing.

Using an accelerated maintenance program, these polishes were cleaned with a mop every other night using hot soapy water, followed by light buffing. After three weeks of this maintenance, the polishes were subjected to machine cleaning. At this point, a heavy duty remover was employed and used at the suggested concentration for cleaning. Following this procedure, both polishes were buffed. The polish of this invention was restored to its original appearance, while the commercial polish was removed.

Essentially the same results were obtained in a comparison of a dry-bright polish of this invention (the polish of Example II) and standard commercial dry-bright polish.

Similar results were obtained in a comparison of the buffable polishes of Example III and the dry-bright polish of Example II with commercial acid-sensitive polishes.

Example VIII

This example illustrates the use of various other polyvalent metal compounds in the floor polishes of this invention. A number of dry-bright polishes were formulated in the same manner as the dry-bright polish of Example II except that the zinc acetate used in the polymer blend of Example I was replaced by an equal weight of (a) aluminum acetate, (b) cadmium acetate, (c) barium aceate, (d) calcium salt of ethylenediamine tetraacetic acid and (e) a control containing no polyvalent metal compound. The dry-bright polishes were applied to suitable tile and permitted to age for one week. Detergent-resistance was evaluated by applying 1 ml. of tripolyphosphate detergent (Spic and Span), allowing it to remain for 3 minutes, rinsing the panel under running water, and then wiping it dry with a soft towel. None of the polishes was affected by the detergent. Each of the polishes, (a) to (d) was removed with the special remover of Example VI while polish (e), which contained no polyvalent metal compound, could not be removed with this remover. The two polishes based on aluminum acetate and cadmium acetate exhibited particularly high gloss.

Example IX

This example illustrates the preparation of a floor polish using a polymer having a relatively high concentration of acid monomer. It also illustrates post stabilization of the polymer emulsion with additional nonionic surface active agent. The polymer emulsion was prepared using the following premixtures:

Catalyst-emulsifier premixture: Parts dry weight
Sodium lauryl sulfate _____ .70
Nonylphenyl ether of polyoxyethylene (9.5) glycol (Igepal CO–630) _____ 1.00
Nonylphenyl ether of polyoxyethylene glycol (Igepal CO–870) _____ 3.00
Tertiary butyl hydroperoxide _____ 0.25
Water _____ 199.4

First monomer premixture:
Styrene _____ 27
Ethyl Acrylate _____ 15.5
Methacrylic acid _____ 15
Second monomer premixture (with additional catalyst):
Styrene _____ 35.5
Acrylonitrile _____ 17.0
Tertiary butyl hydroperoxide _____ 0.15
Promoter:
Ascorbic acid _____ 0.16
Water _____ 35
Additional emulsifier: Lauryl ether of polyoxyethylene (23) glycol (Brij–35) _____ 4.5

The emulsifier-catalyst premixture was prepared in hot water in a suitable glass-lined reactor fitted with a stirrer and jacket. The first monomer premixture was then added to the reactor followed by 12.5% of the promoter. An additional 37.5% of the promoter was added over a period of one hour while the reaction temperature was permitted to rise from 30° C. to about 60–65° C. The second monomer premixture and the rest of the promoter was added over a period of one hour while maintaining the reaction at between 60 and 65° C. The polymerization was forced to completion by raising the reaction temperature to 80° C. for one hour. The reactants were cooled to room temperature, and the additional emulsifier was added. The resulting 36% total solids polymer emulsion had less than 0.05% coagulum and a Tg of 94° C.

A polymer blend was prepared from the emulsion in the manner described in Example I and a dry-bright polish formulated in the manner described in Example II. The polish which was applied to a suitable substrate, had excellent gloss. After one week, the film of polish was resistant to trisodium polyphosphate detergent (Spic and Span), but was easily removable with the special remover of Example VI. A second floor polish was formulated in the same manner, except that the floor polish did not contain any polyvalent metal salt of an organic acid. The polish was not resistant to the trisodium polyphosphate detergent.

Example X

This example illustrates the preparation of a floor polish using a polymer having an acid monomer concentration intermediate between the polymer of Examples I and IX. The following premixtures were prepared:

Emulsifier-catalyst premixture: Parts dry weight
Sodium salt of lauryl polyethoxysulfate ____ 4.0
Nonylphenyl ether of polyoxyethylene (10.5) glycol (Tergitol NPX) _____ 5.0
Tertiary butyl hydroperoxide _____ 0.15
Water _____ 150.6
First monomer premixture (with catalyst):
Styrene _____ 22.0
Ethyl acrylate _____ 15.0
Methacrylic acid _____ 10.0
Tertiary butyl hydroperoxide _____ 0.15
Second monomer premixture (with additional catalyst):
Styrene _____ 36.0
Acrylonitrile _____ 17.0
Tertiary butyl hydroperoxide _____ 0.15
Promoter:
Ascorbic acid _____ 0.16
Water _____ 30.0

The polymerization was carried out in essentially the manner described in Example I. Fifteen percent of the first monomer premixture was added to the emulsifier premixture followed by one-sixth of the promoter. The remainder of the first monomer premixture and one-third of the promoter were added gradually over a period of one hour. Thirty minutes later, the gradual addition of the second monomer premixture and one-third of the promoter was started. The addition was completed in one hour. Thirty minutes later the reaction was forced to completion by adding the remainder of the promotor and raising the reaction temperature to 85° C. The resulting 36% total solids emulsion had less than 0.1% coagulum and a Tg of 95.5° C.

A polymer blend and dry bright floor polish were formulated in the manner described in Examples I and II. The applied floor polish had excellent gloss, resistance to detergent and was removable with the special remover of Example VI. A dry-bright floor polish formulated in the same manner, but without polyvalent metal salt of an organic acid, was partially removed by detergent.

Example XI

This example illustrates the preparation of another preferred polymer of this invention. The following premixture was prepared:

| Catalyst-emulsifier premixture: | Parts dry weight |
|---|---|
| Sodium salt of lauryl polyethoxysulfate | 6.5 |
| Nonylphenyl ether of polyoxyethylene glycol (Tergitol NPX) | 2.0 |
| Tertiary butyl hydroperoxide | 0.15 |
| Water | 208.2 |
| First monomer premixture (with catalyst): | |
| Styrene | 27.0 |
| Ethyl acrylate | 15.5 |
| Methacrylic acid | 3.0 |
| Tertiary butyl hydroperoxide | 0.15 |
| Second monomer premixture (with additional catalyst): | |
| Styrene | 35.5 |
| Acrylonitrile | 17.0 |
| Tertiary butyl hydroperoxide | 0.15 |
| Promoter: | |
| Ascorbic acid | .16 |
| Water | 40.0 |

The polymerization was carried out in the manner described in Example X. The 30% total solids polymer emulsion had less than .2% coagulum and had a Tg of 88° C.

An aqueous solution of the zinc acetate (15.91 parts, 4 parts dry weight), 9.95 parts Tergitol NPX and 18 parts methyl Carbitol were added to 51.19 parts water. This solution (22.2 parts by weight) was then added to 77.8 parts by weight of the 30% total solids polymer emulsion of this example. This blend, 28.5% total solids, was diluted to 14% solids by adding 50.9 parts water to 49.1 parts of the blend.

A dry-bright floor polish was formulated by mixing, in order, with good agitation 87 parts of the 14% total solids polymer blend, 13 parts of the 14% total solids wax emulsion of Example II, 0.9 part tributoxyethyl phosphate, 0.5 part (1% total solids) FC–134 and 2 parts diethylene glycol monomethyl ether. The floor polish exhibited excellent gloss, excellent detergent-resistance and excellent removability with the special remover of Example VI.

Example XII

This example illustrates the preparation of a polymer having a relatively high level of soft monomer. The following premixtures were polymerized by the method of Example X:

| Emulsifier-catalyst premixture: | Parts by weight |
|---|---|
| Sodium salt of lauryl polyethoxysulfate | 4.5 |
| Tertiary butyl hydroperoxide | 0.15 |
| Water | 199.4 |
| First monomer premixture (with catalyst): | |
| Styrene | 10.0 |
| Ethyl acrylate | 35.0 |
| 2-ethylhexyl acrylate | 5.0 |
| Methacrylic acid | 2.5 |
| Tertiary butyl hydroperoxide | 0.15 |
| Second monomer premixture (with additional catalyst): | |
| Styrene | 45.0 |
| Tertiary butyl hydroperoxide | 0.15 |
| Promoter: | |
| Ascorbic acid | 0.16 |
| Water | 40 |

The 30% total solids polymer emulsion had less than .3% coagulum and a Tg of 30.5° C.

A polyethylene wax emulsion for use with this polymer was prepared by melting 100 parts polyethylene, 8 parts sorbitan trioleate and 10 parts nonylphenyl ether of polyoxyethylene (9.5) glycol (Igepal CO–630) together at 220° to 230° F. Seven parts of aqueous KOH (1.4 parts dry solids) was then added. The resulting hot melt was poured into sufficient hot water (200° F.) with good agitation to form a 21% total solids wax emulsion.

After the polymer emulsion had been diluted to 15% total solids, the following ingredients were added to 100 wet parts of the polymer emulsion:

| | |
|---|---|
| Zinc acetate (15% total solids aqueous solution) parts | 15 |
| Polyethylene wax emulsion (21% total solids) parts | 7.2 |
| Tributoxyethyl phosphate ml | 1 |

This composition was modified by adding small increments of a 15% aqueous solution of surfactant (nonylphenyl ether of polyoxyethylene glycol, Tergitol NPX). Rubber tile was coated with the resulting composition and evaluated. As the concentration of the surfactant increased the polish exhibited improved gloss and reduced haze. Optimum gloss was attained with 10 parts of the 15% aqueous solution of the surfactant. Essentially the same results were obtained by employing a 15% aqueous sodium salt of lauryl polyethoxysulfate. Again optimum gloss was attained with 10 parts of the surfactant solution. All of the polishes exhibited excellent detergent resistance, but tended to pick up dirt at a relatively rapid rate.

Example XIII

The polymerization reaction of Example XII was repeated except that the methacrylic acid content was increased from 2.5 to 3.0 parts. The 30% total solids polymer emulsion had less than .1% coagulum and a Tg of 28.5° C.

The polymer emulsion was diluted to 15% total solids. One hundred parts of this polymer emulsion were compounded with 10 parts of a 15% solids aqueous solution of nonylphenyl ether of polyoxyethylene (10.5) glycol (Tergitol NPX), 7.2 parts of the polyethylene wax emulsion of Example XII, 15 parts aqueous zinc acetate (15% total solids) and 1 part tributoxy ethyl phosphate. The applied polish was somewhat tacky and tended to pick up dust. This tackiness was cured by increasing the zinc acetate concentration to 25 parts (15% total solids). However, the applied polish still tended to pick up dirt at a relatively rapid rate.

Example XIV

This example illustrates the preparation of two closely related floor polish polymers composed of the same monomers in slightly different proportions. The following premixtures were prepared:

| | Parts dry weight | |
|---|---|---|
| | A | B |
| Emulsifier-Catalyst Premixture: | | |
| Sodium salt of lauryl polyethoxysulfate | 5.5 | 4.5 |
| Nonylphenyl ether of polyoxyethylene (10.5) glycol (Tergitol NPX) | 0 | 3.0 |
| Tertiary butyl hydroperoxide | 0.15 | 0.15 |
| Water | 202.5 | 197 |
| First Monomer Premixture (with catalyst): | | |
| Styrene | 20.0 | 25.0 |
| Ethyl acrylate | 30.0 | 25.0 |
| Methacrylic acid | 3.5 | 3.5 |
| Tertiary butyl hydroperoxide | .15 | .15 |
| Second Monomer Premixture (with additional catalyst): | | |
| Styrene | 45.0 | 45.0 |
| Tertiary butyl hydroperoxide | .15 | .15 |
| Promoter: | | |
| Ascorbic Acid | .16 | .16 |
| Water | 40 | 40 |

Each of the polymerizations was carried out in the manner described in Example X. Polymer emulsion A had less than .2% coagulum and a Tg of 84.5° C. Polymer emulsion B had less than 0.05% coagulum and a Tg of 90° C.

These polymer emulsions were then used to prepare floor polishes in the manner described in Example XI. The formulations are set forth below in Table IV

TABLE IV

| Components, Wet Parts of Ingredients: | 1 | 2 | 3 | 4 | 5 | 6 | 7 |
|---|---|---|---|---|---|---|---|
| Polymer A at 15% solids | | | 100 | 100 | 100 | 100 | 100 |
| Polymer B at 15% solids | 100 | 100 | | | | | |
| Nonylphenyl ether of polyoxyethylene (10.5) glycol (Tergitol NPX) at 15% solids | 11.0 | 11.0 | 5.0 | 7.0 | 7.0 | 7.0 | 9.0 |
| Polyethylene wax emulsion at 21% solids | 7.2 | 7.2 | 7.2 | 7.2 | 7.2 | 7.2 | 7.2 |
| Zinc acetate at 15% solids | 15.0 | 25.0 | 15.0 | 15.0 | 25.0 | 40.0 | 40.0 |
| Tributoxyethyl phosphate, ml | 1 | 1 | 1 | 1 | 1 | 1 | 1 |
| Polish gloss | (¹) | (¹) | (²) | (¹) | (¹) | (²) | (¹) |

¹ Glossy.
² Slight haze.

Optimum gloss was obtained with polymer B using 11 parts of the polyoxyethylene glycol ether per 100 parts polymer emulsion at a zinc acetate level of 15 to 25 parts per 100 parts polymer emulsion. Optimum gloss was obtained with polymer A, which was somewhat softer than polymer B, using 7 parts of the polyoxyethylene glycol ether per 100 parts polymer emulsion at a zinc acetate level of 15 to 25 parts per 100 parts polymer emulsion. For optimum gloss at 40 parts zinc acetate per 100 parts polymer emulsion, polymer A required 9 parts of the polyoxyethylene glycol ether per 100 parts polymer emulsion. Polishes based on polymer emulsion A tended to pick up more dirt and dust than the polishes based on polymer emulsion B. However, as the concentration of polyvalent metal salt in polishes based on polymer emulsion B increased, there was improvement in this property.

While this invention is directed to floor polishes having both excellent detergent resistance and ease of removal, the invention is susceptible of broader application. To some extent there has been a demand in recent years for floor polishes which can be removed from the flooring with conventional detergents. Acidic floor polishes of the type described herein offer another solution to this problem. Ease of removal is obtained by employing a suitable polymer emulsion of the type described herein, preferably a polymer containing 5 to 15% by weight free carboxyl containing monomer, wax and a polyvalent metal salt of an inorganic acid such as zinc chloride, zinc nitrate, calcium chloride, magnesium chloride, etc. The polyvalent metal salt of an inorganic acid functions as a leveling agent permitting the omission of alkali-soluble resin and facilitates the removal of the applied polish from the flooring.

Since many embodiments may be made of this invention, and since many changes may be made in the embodiments described, the foregoing is to be interpreted as illustrative only, and the invention is defined by the claims following hereafter.

What is claimed is:

1. An acidic polish composition comprising as its essential ingredients (1) a wax, (2) an aqueous emulsion of a synthetic addition polymer comprising (a) at least one hard monomer selected from the group consisting of monovinyl aromatic compound, alpha,beta-ethylenically unsaturated nitrile and alkyl ester of alpha,beta-ethylenically unsaturated carboxylic acid and (b) 0.5 to 25% by weight of alpha,beta-ethylenically unsaturated acid monomer, said polymer having a Tg of at least 25° C. at an emulsifier content of 5% by weight of the polymeric component and (3) a water dispersible polyvalent metal salt of an organic carboxylic acid having from 1 to 4 acid groups in a concentration sufficient to impart leveling and selective removability to said polish composition, said composition being non-film forming at room temperature in the absence of polish coalescing agents and polish plasticizer.

2. An acidic polish composition comprising as its essential ingredients (1) a wax, (2) an aqueous emulsion of a synthetic addition polymer comprising (a) at least one hard monomer selected from the group consisting of monovinyl aromatic compound, alpha,beta-ethylenically unsaturated nitrile and alkyl ester of alpha,beta-ethylenically unsaturated carboxylic acid and (b) 0.5 to 25% by weight of alpha,beta-ethylenically unsaturated acid monomer, said polymer having a Tg of at least 40° C. at an emulsifier content of 5% by weight of the polymeric component and (3) a water dispersible polyvalent metal salt of an organic carboxylic acid having from 1 to 4 acid groups in a concentration sufficient to impart leveling and selective removability to said polish composition, said composition being non-film forming at room temperature in the absence of polish coalescing agents and polish plasticizer.

3. The composition of claim 2 wherein said polyvalent metal compound comprises from 5 to 100 parts by weight per 100 parts by weight of polymeric component.

4. The composition of claim 2 wherein said polyvalent metal compound comprises from 10 to 25 parts by weight per 100 parts by weight of polymeric component and said composition comprises nonionic surface active agent in a concentration of about 0.5 to 2 parts by weight per part by weight of polyvalent metal compound.

5. The composition of claim 4 wherein said polyvalent metal salt of an organic acid comprises at least one salt of a metal selected from the group consisting of zinc, aluminum and cadmium.

6. The composition of claim 4 wherein said polyvalent metal salt of an organic acid comprises zinc acetate.

7. The composition of claim 2 wherein said polish contains from 10 to 60 parts by weight fugitive coalescing agent per 100 parts by weight of addition polymer.

8. The composition of claim 2 wherein said synthetic copolymer comprises from 60 to 85% by weight of a hard monomer, from 10 to 35% by weight of a soft monomer and from 0.5 to 15% by weight of an alpha,beta-ethylenically unsaturated free-carboxyl-containing monomer.

9. The composition of claim 8 wherein said polyvalent metal salt of an organic acid comprises from 10 to 25 parts by weight per 100 parts by weight of polymeric component and said composition comprises nonionic surface active agent in a concentration of 0.5 to 2.0 parts by weight per part by weight of polyvalent metal salt.

10. The composition of claim 9 wherein said polyvalent metal salt comprises an acetic acid salt of a metal selected from a group consisting of zinc, aluminum and cadmium.

11. An acidic polish composition comprising as its essential ingredients (1) a water-dispersible polyvalent metal salt of an organic acid having from 1 to 4 acid groups in a concentration sufficient to impart leveling and selective removability to said polish composition (2) an aqeous emulsion of a synthetic addition polymer, said polymer having a Tg of at least 40° C. at an emulsifier content of 5% by weight of the polymeric component, said synthetic addition polymer comprising from 60 to 85% by weight of a hard monomer of which at least 50% by weight is selected from at least one monomer of the class consisting of monovinyl aromatic compound and alpha,beta-ethylenically unsaturated nitrile, from 10 to 35% by weight of a soft ester of an alpha,beta-ethylenically unsaturated monocarboxylic acid and from 0.5 to 15% by weight of an alpha,beta-ethylenically unsaturated free-carboxyl-containing monomer and (3) wax.

12. The composition of claim 11 wherein said monovinyl aromatic compound comprises styrene and said alpha,beta-ethylenically unsaturated nitrile comprises acrylonitrile.

13. The composition of claim 11, wherein at least 50% by weight of said polymer is selected from at least one monomer of the class consisting of monovinyl aromatic compound and alpha,beta-ethylenically unsaturated nitrile.

14. The composition of claim 12 wherein the metal ion of said salt is selected from the group consisting of zinc, aluminum and cadmium.

15. The composition of claim 14 wherein said polyvalent metal salt comprises from about 10 to 25 parts by weight per 100 parts by weight of synthetic polymeric material and said composition comprises nonionic surface active agent in a concentration of 0.5 to 2.0 parts per part by weight of polyvalent metal salt.

16. The composition of claim 15 wherein said polyvalent metal salt comprises zinc acetate.

17. The composition of claim 11 wherein the concentration of wax is sufficient to make said composition a buffable floor polish.

18. The process for treating and preserving resilient flooring which comprises applying a polish composition comprising as its essential ingredients (1) a wax, (2) an aqueous emulsion of a synthetic addition polymer comprising (a) at least one hard monomer selected from the group consisting of monovinyl aromatic compound, alpha,beta-ethylenically unsaturated nitrile and alkyl ester of alpha,beta-ethylenically unsaturated carboxylic acid and (b) 0.5 to 25% by weight of an alpha,beta-ethylenically unsaturated acid monomer, said polymer having a Tg of at least 40° C. at an emulsifier content of 5% by weight of the polymeric component and (3) a water-dispersible polyvalent metal salt of an organic carboxylic acid having from 1 to 4 acid groups in a concentration sufficient to (a) ionically cross-link sufficient free acid groups in said addition polymer to impart selective detergent resistance to said polish layer and (b) permit removal of the polish layer with suitable alkaline remover.

References Cited
UNITED STATES PATENTS

| | | | |
|---|---|---|---|
| 2,343,089 | 2/1944 | Smith. | |
| 2,754,280 | 7/1956 | Brown et al. | 260—296 |
| 2,923,692 | 2/1960 | Ackerman et al. | 260—28.5 |
| 2,971,934 | 2/1961 | Brown et al. | 260—28.5 |
| 3,026,281 | 3/1962 | Harren et al. | |
| 3,308,078 | 3/1967 | Rogers et al. | 260—27 |
| 3,328,325 | 6/1967 | Zdanowski | 260—28.5 |

JULIUS FROME, *Primary Examiner.*

B. A. AMERNICK, *Assistant Examiner.*

UNITED STATES PATENT OFFICE
CERTIFICATE OF CORRECTION

Patent No. 3,403,119                        September 24, 1968

Charles I. Sullivan et al.

It is certified that error appears in the above identified patent and that said Letters Patent are hereby corrected as shown below:

Column 2, line 27, "glass" should read -- gloss --.
Columns 14 and 15, Table II, last column, 14th figure down, "14" should read -- (1) --.

Signed and sealed this 30th day of March 1971.

(SEAL)
Attest:

EDWARD M. FLETCHER, JR.                     WILLIAM E. SCHUYLER, JR.
Attesting Officer                             Commissioner of Patents